Nov. 11, 1947.   H. W. MATLOCK   2,430,578
LIQUID FILTER VALVE STRUCTURE
Filed Feb. 7, 1945
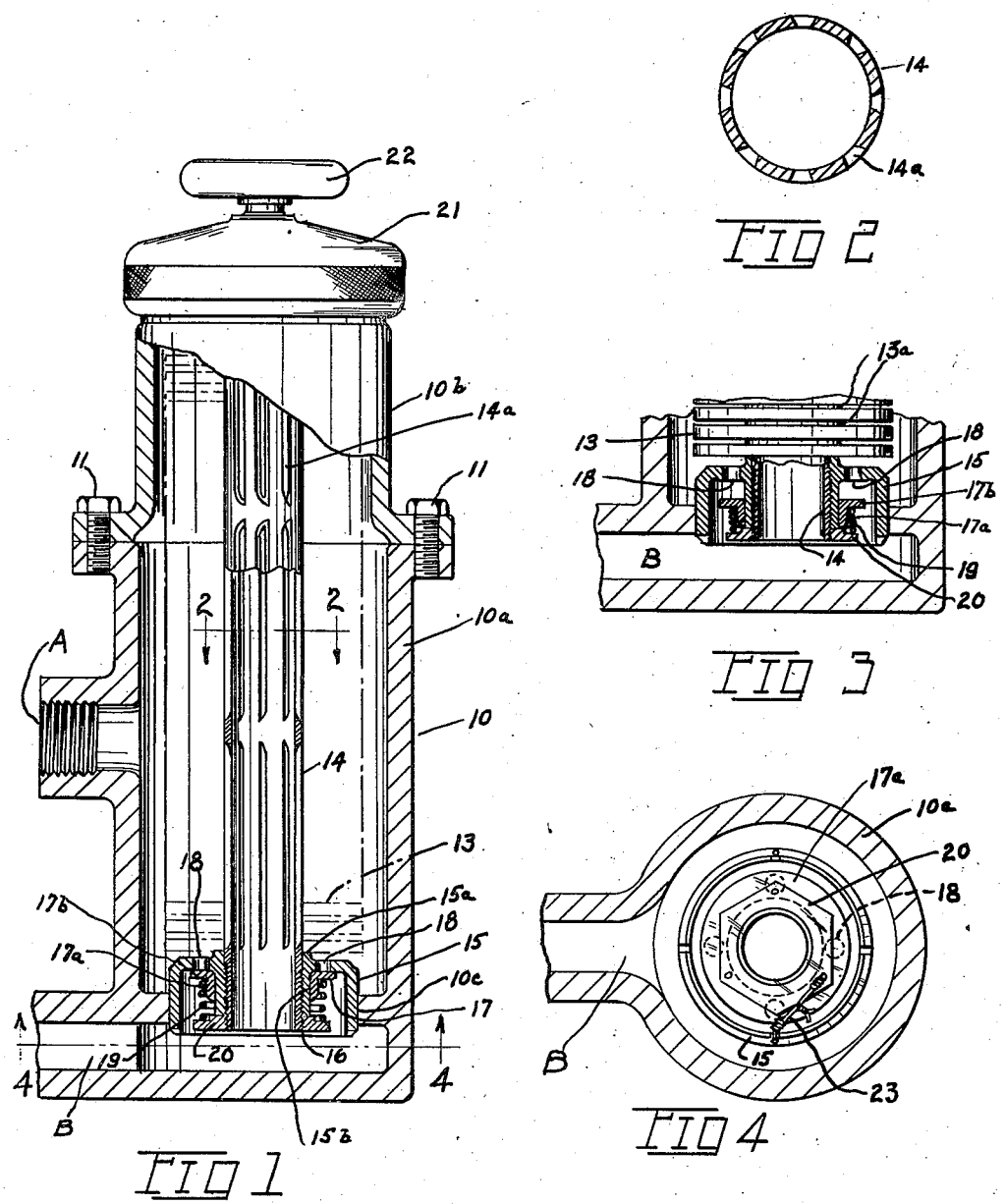
INVENTOR.
HENRY W. MATLOCK
BY
Hyde and Meyer Patented Nov. 11, 1947

2,430,578

UNITED STATES PATENT OFFICE 2,430,578

LIQUID FILTER VALVE STRUCTURE

Henry W. Matlock, Garfield Heights, Ohio, assignor to Air-Maze Corporation, Cleveland, Ohio, a corporation of Delaware Application February 7, 1945, Serial No. 576,671

1 Claim. (Cl. 210—183)

This invention relates to a novel valve structure in connection with a liquid filter and more specifically relates to an improvement in a relief valve structure.

An object of the present invention is to provide in combination with a liquid filter and a pilot member for holding the filter in assembled position, a relief valve structure built into the pilot member and adapted to open in an emergency to permit a liquid flow in case the filter becomes plugged.

Other objects and advantages of the present invention will be apparent from the accompanying drawings and specification, and the essential features thereof will be summarized in the appended claim.

In the drawings,

Fig. 1 is a view of one embodiment of my device partly in elevation and partly in central sectional view to more clearly show the structure;

Fig. 2 is an enlarged transverse sectional view taken along the line 2—2 of Fig. 1;

Fig. 3 is a view similar to the lower portion of Fig. 1 and showing the relief valve in open position; while Fig. 4 is a transverse sectional view taken along the line 4—4 of Fig. 1.

I have chosen to illustrate my invention associated with a liquid filter of the general type shown in the copending application of George M. Walton, Serial Number 483,911, filed April 21, 1943. The main parts of such a filter comprise a housing 10 which may be in one piece, but which here is shown as comprising a lower portion 10a and an upper portion 10b secured together by the cap screws 11. Liquid inlet to this housing is by way of the passageway A and the outlet is through the passageway B. Mounted in the housing are a plurality of filter packs 13 of leaf-form. It is not deemed necessary to show the details of these packs here, but it is sufficient to say that they may be of the type disclosed in the above-mentioned Walton application or in the copending application of Robert A. Behlen, Serial Number 516,616, filed January 1, 1944, or they may be of any other suitable form. Each of the packs 13 is of annular form having a filtering surface on both the upper and lower faces and having a hollow central portion which communicates through the slotted openings 14a of the central tube 14 with the interior of the tube. A series of the packs 13 are held in assembled parallel position on the tube 14 with spacing rings 13a between them, by means of a nut (not shown) threaded on the upper end of tube 14. The upper end of tube 14 is closed by means (not shown), but which is housed in the cap 21 whose lower edge has a threaded connection with the upper portion of the housing 10b. The hand wheel 22 has a threaded connection with this means for closing the end of tube 14 and holds all of the parts assembled in the position shown in the drawings. It should be obvious from the above description that in the normal operation of the device, liquid to be filtered enters through the opening A and passes through the filtering surfaces of the disks or packs 13 depositing the entrained particles on the filter surfaces. The clean liquid passes through the central portion of each disk, then through the slots 14a, then downwardly through tube 14 and out through the passageway B.

Means is provided for centering and properly positioning the sub-assembly consisting of the packs 13 and the tube 14. This means comprises the pilot member 15 which is threaded on the lower end of tube 14 at 16. The shoulder 15a on the pilot then forms the lowermost abutment for holding the packs 13 in place on the tube 14. The cylindrical side walls of the pilot 15 fit tightly in the opening 10c of a partition wall in the housing 10a. It will be noted that the pilot 15 is of cup-shape opening downwardly, and I utilize the hollow portion within the cup-shape member for the housing of my improved relief valve structure.

The annular wall 15b of the pilot 15 has its inner surface in threaded connection with the tube 14 as previously mentioned. The outer surface of this wall 15b is of smooth cylindrical form and serves to hold and guide the relief valve 17 which is an annular ring, L-shape in section and having a sleeve portion 17a which fits slidingly on the outer surface of wall 15b. The flange 17b extends radially outwardly from the sleeve portion 17a and provides the relief valve which acts to normally close the openings 18 through the top wall of the pilot 15. A helical spring 19 surrounds the sleeve portion 17a and is held under initial compression by means of the nut 20 threaded on the lower end of tube 14. Preferably, this nut is wired, as indicated at 23, to the pilot member 15 so as to prevent accidental slackening of the nut which would permit a loosening of the parts assembled on tube 14.

The normal position of the relief valve is indicated in Fig. 1 where the spring 19 presses the flange portion 17b tightly against the upper wall of the pilot 15 closing the openings 18 against the passage of liquid. If the filter becomes plugged, then the difference in pressure in the part of the housing 10 communicating with passageway A becomes sufficiently greater than the pressure in the outlet passageway B to move the relief valve 17 from the position shown in Fig. 1 to that shown in Fig. 3 permitting the escape of liquid directly from the main portion of housing 10 through the openings 18 and into the outlet passageway B. Obviously, when the excess pressure condition is relieved, the spring 19 closes the valve 18 and the filter resumes its normal operation. Generally, it will be necessary to release the hand wheel 22, unscrew the cap 21, and remove the tube 14 with its assembled packs 13 for the purpose of cleaning the accumulated filtrate from the surfaces of the packs 13 in order to relieve the excess pressure condition mentioned above. In such case, the pilot 15 and the assembled relief valve structure is removed along with the tube 14 but need not necessarily be disturbed during the washing operation of the packs 13. When the parts are reassembled in the position shown in Fig. 1, the relief valve is ready to function as previously described.

The tube 14 and pilot member 15 are held in their assembled position shown in the drawings by means of welding the top of tube 14 to the cap 21. This is not shown as any suitable securing means may be used for this purpose.

What I claim is:

In a liquid filter having a housing provided with a liquid inlet and having a liquid outlet at one end of said housing, a filter element in said housing including a central perforated tube surrounded by filtering means adapted to filter liquid passing from the chamber of said housing inwardly toward said tube, said housing having an opening at its end opposite said outlet through which said element including said tube may be removed, closure means for said opening, a cup-shape pilot member secured to one end of said tube with the bottom wall of said cup-shape member toward said filtering means, the side walls of said cup-shape member adapted to slidingly enter said outlet, there being one or more openings through said bottom wall of said cup-shape member communicating with the interior of said housing outside said element, a valve in said cup-shape member for closing said openings, and spring means urging said valve closed.

HENRY W. MATLOCK.

REFERENCES CITED

The following references are of record in the file of this patent:

UNITED STATES PATENTS

| Number | Name | Date |
|---|---|---|
| 1,165,640 | Utz et al. | Dec. 28, 1915 |
| 2,294,330 | Clark | Aug. 25, 1942 |
| 1,909,308 | Nugent | May 16, 1933 |
| 511,798 | Rankine | Jan. 2, 1894 |
| 1,869,589 | Tischer | Aug. 2, 1932 |
| 1,676,268 | Lipscomb | July 10, 1928 |
| 1,944,550 | Ericson | Jan. 23, 1934 |
| 2,088,199 | Gleason | July 27, 1937 |
| 2,311,320 | Williams | Feb. 16, 1943 |
| 2,057,932 | Bolser | Oct. 20, 1936 |
| 1,619,118 | Guy et al. | Mar. 1, 1927 |

FOREIGN PATENTS

| Number | Country | Date |
|---|---|---|
| 549,086 | Germany | Apr. 22, 1932 |